US012592157B2

(12) United States Patent
Narasimhulu et al.

(10) Patent No.: US 12,592,157 B2
(45) Date of Patent: Mar. 31, 2026

(54) AIRSPACE MANAGEMENT SYSTEMS AND METHODS

(71) Applicant: The Boeing Company, Chicago, IL (US)

(72) Inventors: Veeresh Kumar Masaru Narasimhulu, Bangalore (IN); Ajaya Srikanta Bharadwaja, Bangalore (IN)

(73) Assignee: The Boeing Company, Arlington, VA (US)

( * ) Notice: Subject to any disclaimer, the term of this patent is extended or adjusted under 35 U.S.C. 154(b) by 348 days.

(21) Appl. No.: 17/539,096

(22) Filed: Nov. 30, 2021

(65) Prior Publication Data

US 2022/0292993 A1 Sep. 15, 2022

(30) Foreign Application Priority Data

Nov. 25, 2020 (IN) ......................... IN202011051284

(51) Int. Cl.
*G08G 5/00* (2025.01)
*G08G 5/56* (2025.01)

(52) U.S. Cl.
CPC ................. *G08G 5/56* (2025.01); *G08G 5/00* (2013.01)

(58) Field of Classification Search
CPC ............................... G08G 5/0043; G08G 5/00
USPC ............................................... 342/36; 324/36
See application file for complete search history.

(56) References Cited

U.S. PATENT DOCUMENTS 5,200,901 A * 4/1993 Gerstenfeld ........... G09B 9/006 701/120
7,664,596 B2 2/2010 Wise et al.
7,877,197 B2 1/2011 Lewis et al.
(Continued)

FOREIGN PATENT DOCUMENTS

CN 101241564 A 8/2008
CN 101286270 A 10/2008
(Continued)

OTHER PUBLICATIONS

Gianazza, "Learning Air Traffic Controller Workload from Past Sector Operations," HAL Id: hal-01592233, pp. 1-7 (Year: 2017).*
(Continued)

*Primary Examiner* — William Kelleher
*Assistant Examiner* — Samarina Makhdoom
(74) *Attorney, Agent, or Firm* — Harrity & Harrity, LLP

(57) ABSTRACT

A method for managing air traffic in one or more sectors of a controlled airspace is disclosed, including defining a first sector configuration of at least two adjacent sectors in the airspace, each sector being assigned to a station controller in an air traffic control station and a communication channel. The method includes monitoring, for each sector, an anticipated level of air traffic controller workload over a selected time interval, and detecting a difference greater than a pre-selected threshold in anticipated levels of air traffic controller workload in the two adjacent sectors over the selected time interval. The method includes redefining the first sector configuration into a second sector configuration of the two adjacent sectors, such that the difference in controller workload in the two adjacent sectors is below the threshold, and then implementing the second sector configuration.

20 Claims, 7 Drawing Sheets

(56) References Cited

U.S. PATENT DOCUMENTS

| | | | | |
|---|---|---|---|---|
| 8,107,961 | B1 * | 1/2012 | Vargantwar | H04W 36/0085 455/452.2 |
| 9,355,566 | B2 | 5/2016 | Garrido-Lopez et al. | |
| 9,430,948 | B2 | 8/2016 | Henderson | |
| 9,558,670 | B1 * | 1/2017 | Sheth | G08G 5/006 |
| 9,870,711 | B2 | 1/2018 | Kang et al. | |
| 10,269,251 | B2 | 4/2019 | Berge | |
| 10,402,675 | B2 | 9/2019 | Owechko | |
| 2004/0093351 | A1 * | 5/2004 | Lee | G06Q 10/04 |
| 2007/0043481 | A1 * | 2/2007 | Metschan | G08G 5/32 701/120 |
| 2009/0130982 | A1 * | 5/2009 | Coulmeau | G08G 5/55 455/63.3 |
| 2013/0281106 | A1 * | 10/2013 | Lynch | H04B 7/18506 455/452.1 |
| 2014/0343760 | A1 | 11/2014 | Le Gall et al. | |
| 2015/0120100 | A1 | 4/2015 | Sacle et al. | |
| 2016/0362194 | A1 | 12/2016 | Boyer et al. | |
| 2017/0263131 | A1 * | 9/2017 | Blomberg | G08G 5/0013 |
| 2017/0352281 | A1 | 12/2017 | Donovan | |
| 2018/0009545 | A1 | 1/2018 | Black, Jr. et al. | |
| 2018/0061243 | A1 * | 3/2018 | Shloosh | G08G 5/0043 |
| 2018/0218615 | A1 * | 8/2018 | Myr | B64F 1/002 |
| 2018/0284813 | A1 | 10/2018 | Boyer et al. | |
| 2020/0023994 | A1 | 1/2020 | Lax et al. | |
| 2020/0202724 | A1 | 6/2020 | De Riese | |

FOREIGN PATENT DOCUMENTS

| | | | | |
|---|---|---|---|---|
| CN | 101923790 | A | 12/2010 | |
| CN | 106251706 | A | 12/2016 | |
| CN | 111009155 | A | 4/2020 | |
| EP | 2849167 | A1 | 3/2015 | |
| EP | 3671695 | A1 | 6/2020 | |
| GB | 2589302 | A | 6/2021 | |
| JP | 2016062449 | A | 4/2016 | |
| WO | WO-2013078461 | A1 * | 5/2013 | A61B 3/113 |

OTHER PUBLICATIONS

Wong et al. "CDAS: A Cognitive Decision-Making Architecture for Dynamic Airspace Sectorization for Efficient Operations," IEEE Transactions on Intelligent Transportation Systems, vol. 20, No. 5, May 2019, pp. 1659-1668 (Year: 2019).*

Riberio et al, Review of Conflict Resolution Methods for Manned and Unmanned Aviation, Aerospace 2020, 7, 79; doi: 10.3390/aerospace7060079, Jun. 16, 2020 (Year: 2020).*

Unger et al. "Predicting Air Traffic Controller Workload: Trajectory Uncertainty as the Moderator of the Indirect Effect of Traffic Density on Controller Workload Through Traffic Conflict," DOI: 10.1177/0018720816639418, 2016 (Year: 2016).*

Wong, Cheryl Sze Yin et al., "CDAS: A Cognitive Decision-Making Architecture for Dynamic Airspace Sectorization for Efficient Operations." IEEE Transactions on Intelligent Transportation Systems 20.5 (2018): 1659-1668.

European Patent Office, Extended European Search Report regarding European Patent Application No. 21194233.9, dated Feb. 22, 2022, 9 pages.

European Patent Office, Extended European Search Report regarding European Patent Application No. 21194037.4, dated Feb. 24, 2022, 9 pages.

Szmuk et al., Successive Convexification for 6-DoF Powered Descent Guidance with Compound State-Triggered Constraints, AIAA Scitech Forum, 2019, 17 pages.

Ramon Andreu Altava, Computation of Optimal Profiles in Descent and Approach Phases, Hal open science, 2020, 163 pages.

U.S. Patent and Trademark Office, Non-Final Office Action regarding U.S. Appl. No. 17/539,107, dated Dec. 19, 2023, 34 pages.

* cited by examiner

AIRSPACE MANAGEMENT SYSTEMS AND METHODS

BACKGROUND

As air travel increases, management of air traffic has become more complex and challenging. For air traffic control purposes, airspace is typically divided into a plurality of sectors that assist Air Navigation Service Providers (ANSPs) in the management of inbound and outbound aircraft flight coordination. Airspace sectors are typically three-dimensional (3D) spaces defined by lateral and vertical virtual boundaries. For example, individual sectors may extend closely around an air traffic control station. Each sector is assigned to a controller in an air traffic control station to monitor and manage air traffic in the sector. At any given time, specific sectors may have more air traffic to manage compared to others, resulting in a workload imbalance between air traffic controllers. Improved systems and methods of maintaining workload balance among a group of air traffic controllers are desirable.

SUMMARY

The present disclosure provides systems, apparatuses, and methods relating to airspace management. In some examples, a method of controlling air traffic in an airspace may include defining a first sector configuration of at least two adjacent sectors in the airspace, each sector being assigned to a station controller in an air traffic control station to manage the movement of one or more aircraft in the respective sector, and a communication channel different from the other sectors. The method may include monitoring for each sector an anticipated level of air traffic controller workload over a selected time interval. The method may include detecting a difference greater than a pre-selected threshold in anticipated levels of air traffic controller workload in the two adjacent sectors over the selected time interval. The method may include redefining the first sector configuration into a second sector configuration of the two adjacent sectors, such that the difference in controller workload in the two adjacent sectors is below the threshold, and then implementing the second sector configuration.

In some examples, a system for managing air traffic in an airspace may include a processor configured to balance levels of anticipated air traffic controller workload between controllers in an air traffic control station. The system may be configured to define a first sector configuration of at least two adjacent sectors in an airspace, each sector being assigned to a station controller for managing movement of one or more aircraft in the respective sector, and a communication channel different from any other sector. The system may be configured to for monitor for each sector, an anticipated level of air traffic controller workload over a selected time interval. The system may detect a difference greater than a pre-selected threshold in anticipated levels of air traffic control workload between the two adjacent sectors over the selected time interval. The system may then redefine the first sector configuration into a second sector configuration of the two adjacent sectors such that the difference in anticipated air traffic controller workload in the two adjacent sectors is below the threshold. The system then implements the second sector configuration.

In other examples, a method of balancing air traffic controller work load includes defining multiple sectors in an airspace. A controller is assigned to each sector to manage movement of one or more aircraft in the respective sector.

The method includes detecting an imbalance in levels of anticipated air traffic controller workload relative to two or more sectors over a selected time interval. The method includes rebalancing the levels of anticipated air traffic workload for the two or more sectors by redefining the sectors.

Features, functions, and advantages may be achieved independently in various examples of the present disclosure, or may be combined in yet other examples, further details of which can be seen with reference to the following description and drawings.

DETAILED DESCRIPTION

Figure 1:
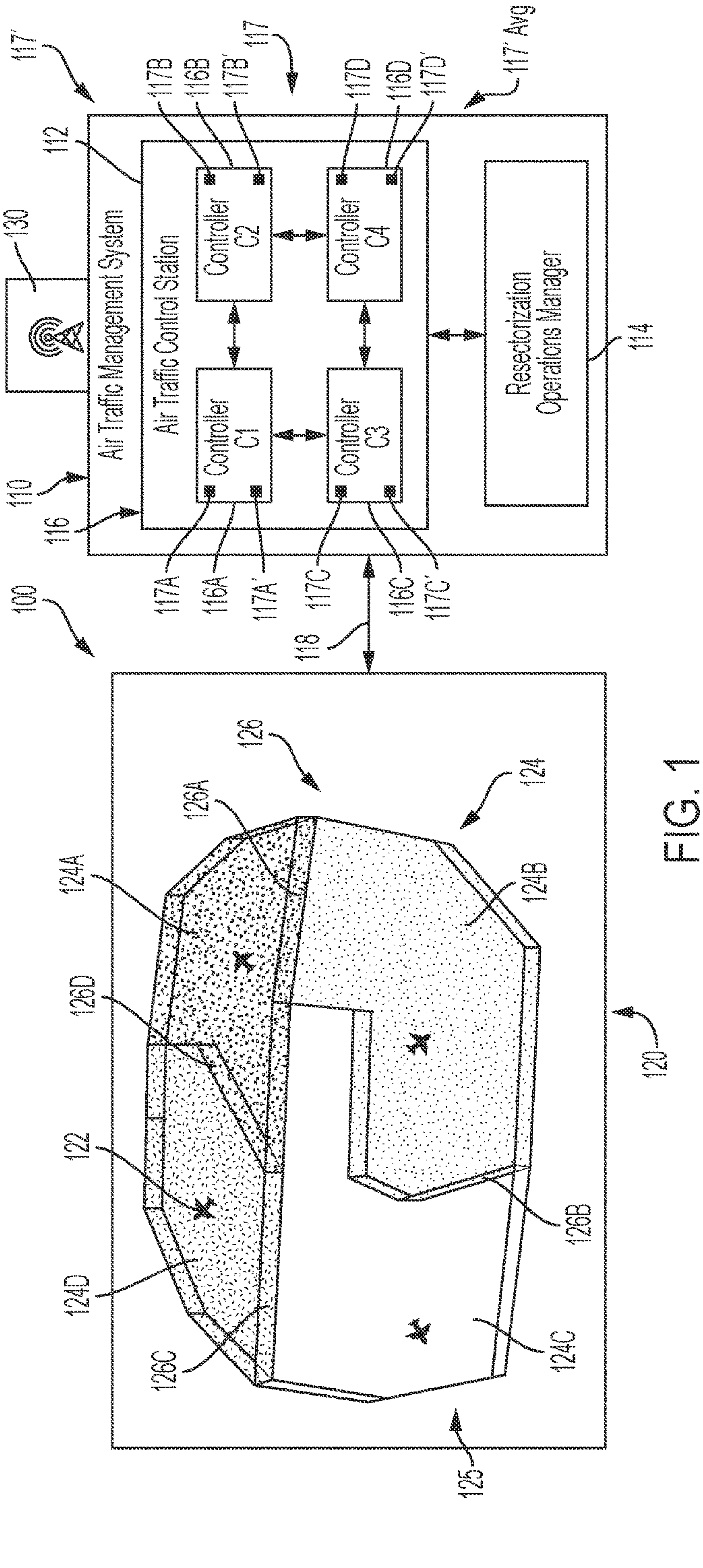
FIG. 1 is a schematic diagram of an illustrative airspace management system for managing airspace sectors in accordance with aspects of the present disclosure.

Various aspects and examples of airspace management systems and methods, are described below and illustrated in the associated drawings. Unless otherwise specified, an air traffic management system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A and B, each of which is labeled accordingly.

Overview

In general, airspace management systems actively manage and control flight operations of a plurality of aircraft in a controlled airspace. Controllers managing an airspace may be overburdened by workloads involving an increased number of complex control actions. The airspace management systems disclosed herein improve the balance of concurrent controller workloads. Air traffic control workload management may be performed by dynamically resectorizing in real-time, one or more sectors in the controlled airspace to meet demands of constantly changing air traffic volumes and situations. Systems and methods described herein may be implemented to manage aircraft flying in a variety of phases of flight, including preflight, takeoff, departure, cruising, descent, approach, and landing.

Technical solutions are disclosed herein for efficient air traffic control management. Specifically, the disclosed systems and methods address technical problems relating to air traffic management technology and arising in the realm of computers configured for managing airspace sectors used by manned and unmanned aircraft, particularly, the technical problem of unbalanced workloads among a concurrent group of air traffic controllers. Systems and methods disclosed herein solve the technical problems by dynamically reconfiguring the airspace sectors for an upcoming time interval so as to balance controller workloads. The technical features associated with addressing this problem involve (i) simulation of an anticipated air traffic, (i) prediction of an anticipated controller workload, (iii) comparative analysis of anticipated controller workloads for two or more airspace sectors, and (iv) implementing a resectorization module to resectorize airspace sectors to achieve controller workload balance. Therefore, aspects of these technical features exhibit technical effects with respect to facilitating safe and efficient airspace management by redistributing controller workload uniformly over the airspace sectors.

Aspects of airspace management systems and methods may be embodied as a computer method, computer system, or computer program product. Accordingly, aspects of disclosed airspace management systems and/or methods may take the form of an entirely hardware example, an entirely software example (including firmware, resident software, micro-code, and the like), or an example combining software and hardware aspects, all of which may generally be referred to herein as a "circuit," "module," or "system." Furthermore, aspects of the airspace management systems and/or methods may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the airspace management may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of airspace management systems and methods are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other devices to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the disclosed airspace management systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary airspace management systems as well as related systems and methods. The examples in these sections are intended for illustration and should not be interpreted as limiting the entire scope of the present disclosure. Each section may include one or more distinct examples, and/or contextual or related information, function, and/or structure.

A. Illustrative Airspace Management System

Figure 2B:
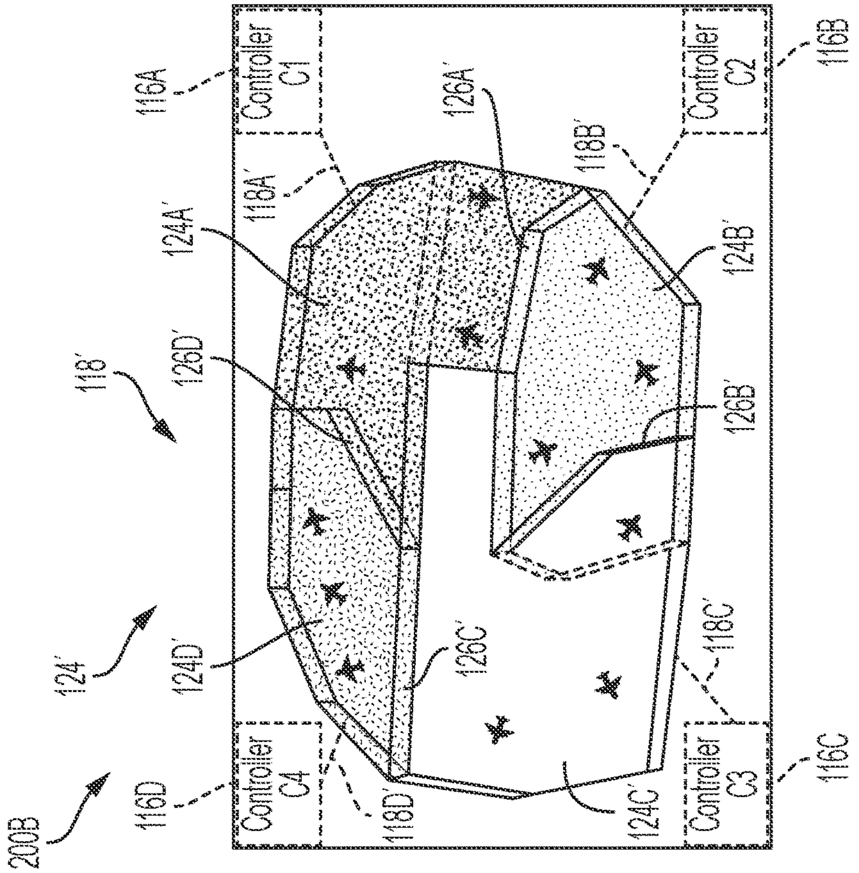
FIG. 2B is a schematic diagram of a balanced workload on controllers after resectorization of the airspace sectors of FIG. 1.
Figure 2A:
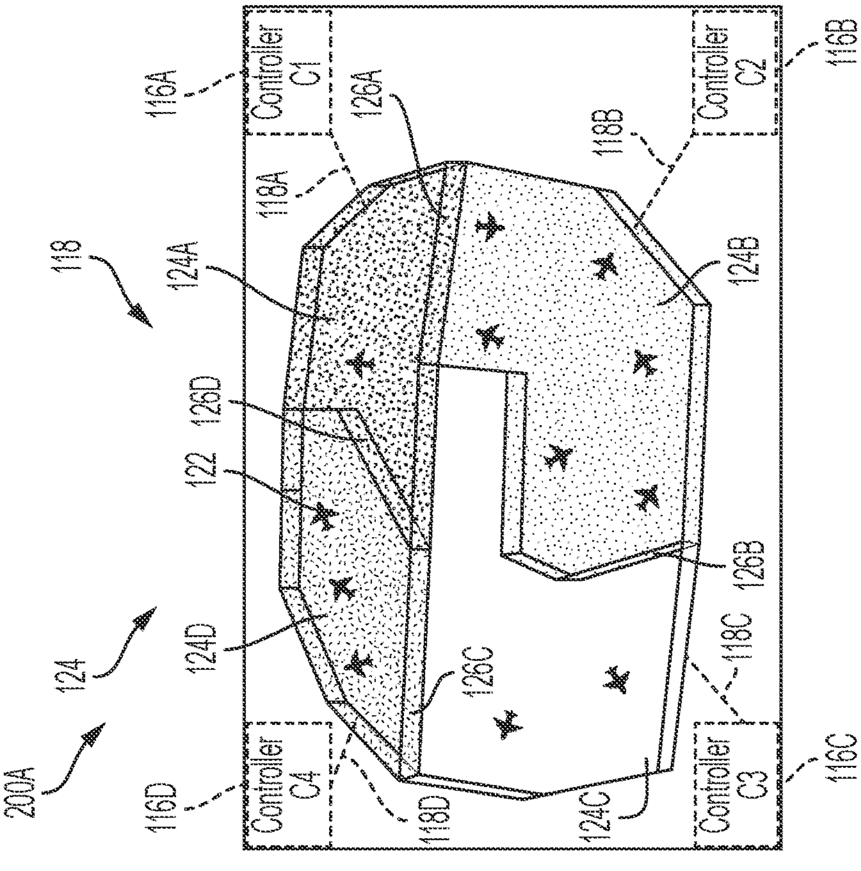
FIG. 2A is a schematic diagram of an unbalanced workload on controllers before resectorization of the airspace sectors of FIG. 1.
Figure 3:
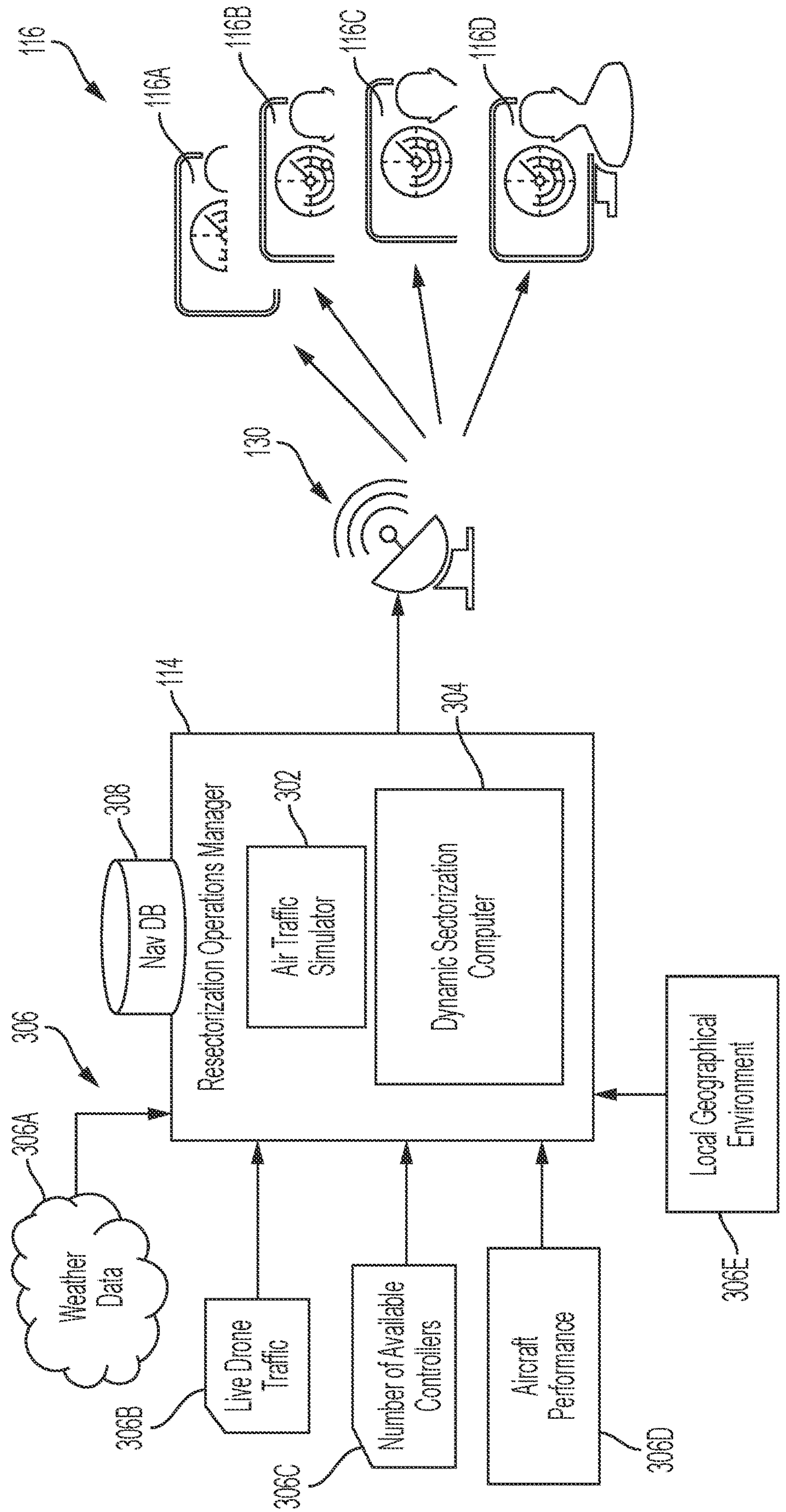
FIG. 3 is a schematic diagram of an illustrative resectorization system.

As shown in FIGS. 1-3, this section describes an illustrative airspace management system 100, including an air traffic management system 110. Air traffic management system 110 may be used for managing manned and/or unmanned air traffic in a controlled airspace 120, and is an example of an airspace management system as described above.

FIG. 1 is a schematic diagram of airspace management system 100, including air traffic management system 110 in synchronous wireless communication with aircraft in controlled airspace 120 through a radar communication system 130. As will be explained in greater detail below, airspace management system 100 monitors and manages flight operations, or movement, of one or more aircraft 122, also known as air traffic in airspace 120. Typical flight operations may include one or more of (i) enplanement and takeoff of outbound flights; (ii) approach, landing, and deplanement of inbound flights; and (iii) flights en route from an origin to a destination, regardless of whether they involve cargo, passengers, or neither.

As shown in FIG. 1, in the present example, air traffic management system 110 of airspace management system 100 includes an air traffic control station or control station 112 configured to communicatively exchange air traffic-related data with a resectorization operations manager or operations manager 114 or system. Control station 112 may send and receive information to and from each of aircraft 122 through radar communication system 130. For example, control station 112 may transmit updated operational information determined by operations manager 114 to one or more aircraft 122. The control station may be used to collect information relating to the various aircraft 122 including, but not limited to: an initial point of takeoff, a current aircraft position, a destination point, an aircraft type, weather conditions, air traffic control data, headings, altitudes, speed, originally planned flight route, and fuel status. The information collected by control station 112 may be synchronously shared with operations manager 114.

In some examples, airspace 120 may be a controlled airspace near an airport, governed by airport air traffic control authorities. In such cases, system 100 may be referred to as an airport air traffic management (ATM). Airspace 120 may have aircraft 122 in different phases of flight such as taxiing and takeoff. Management of the airspace may include start-up control, taxi control and departure and arrival control in relation to aircraft activity on the ground at the airport. Airspace 120 may additionally or alternatively have aircraft 122 in other phases of flight such as arrival and departure. Management of the airspace may then include early stages of climb, late stages of descent and approach phases of flight, including cruise, late stages of climb and early stages of descent of flights.

In some examples, airspace 120 may be a controlled airspace aligned along a flight route of aircraft 122, operating between an origin and a destination location. In this case, airspace 120 may be governed by origin and destination airport air traffic control authorities and one or more en route control stations located along the flight route. The origin and destination air traffic control authorities may be in wireless synchronous communication with the en route control stations to facilitate a safe and efficient flight for aircraft 122. In some examples, aircraft 122 may be a manned aircraft carrying passengers from an origin to a destination location. In some examples, aircraft 122 may be an unmanned aircraft or unmanned aerial vehicle or drone vehicle for investigating or carrying air cargo from a first location to a second location. In such cases, system 100 may be referred to as an unmanned aircraft traffic management system (UTM).

Referring back to FIG. 1, airspace 120 is divided into a plurality of airspace portions, namely airspace sectors or basic sectors or primary sectors or sectors 124. FIG. 1 depicts four such sectors, however airspace 120 may be divided into fewer or more sectors to form a network of sectors or sector configuration 125. Each sector represents a three-dimensional (3D) space, and may share common boundaries 126 with other horizontally and/or vertically adjacent sectors. For example, common lateral boundary 126 may be a vertical plane. Alternatively, a common lateral boundary 126 may be nonlinear in an X-Y direction and/or may be nonlinear in a Z direction. Sectors 124 may represent designated areas of operation for one or more aircraft 122. For descriptive convenience, sectors 124 are labeled in FIG. 1 as sector 124A, sector 124B, sector 124C, and sector 124D. A range of operation for sectors 124 is determined by the distance over which the controllers in control station 112 track and/or communicate with aircraft 122. For example, a controller may communicate with aircraft 122 that are hundreds of miles or more away from the station. Therefore, a sector may extend for hundreds of miles or more.

Sectors 124 may be part of sector network or sector configuration 125, where each sector includes different profiles and shapes. While FIG. 1 illustrates irregularly shaped sectors, this illustration is merely exemplary in nature and the disclosure should not be limited to the illustrated example. Indeed, those of ordinary skill in the art will appreciate that each sector 124 may include any shape and may be, for example, standard geometrical shapes, including any type of regular or irregular polygon. Moreover, sectors 124 may include geometry that is a reflection of the flow and density of the air traffic within airspace 120. For example, particular sector configurations and geometries may be at least party determined or affected by local topography such as mountains and geographical features.

Sectors 124 are controlled by a team or plurality of air traffic controllers, namely controllers 116 stationed at control station 112. FIG. 1 depicts four such controllers, but any number may be implemented. Each of controllers 116 may cooperatively communicate with each other and with operations manager 114 to ensure safe and efficient operations of flights by at least separating aircraft 122 from each other according to standard separation protocols. For descriptive convenience, controllers 116 are labeled in FIG. 1 as controller 116A, controller 116B, controller 116C, and controller 116D.

In some examples, each controller 116 may be dedicated to control an individual sector 124. In some examples, two or more controllers may team up to control an individual sector 124. In such examples, each of the two or more controllers 116 may be configured to monitor, control, and facilitate all phases of flight, as described above, for one or more aircraft 122 operating in the sectors in a given time interval. Alternatively, each controller 116 may be dedicated to a particular phase of flight or sub-set of flight phases. Each controller 116 may include one or more computing systems configured to operate automatically and/or to be handled by trained air traffic personnel.

Each sector in airspace 120 is designated a unique operational frequency 118 (or channel) for communication with controller 116 at control station 112. For example, controller 116A may utilize frequency 118A to communicate with aircraft in sector 124A, and likewise controllers 116B, 116C, and 116D may use individual frequencies 118B, 118C, and 118D, respectively, to communicate with aircraft in their respective sectors 124B, 124C, 124D. Sets of virtual boundaries 126, namely horizontal and vertical boundaries, define limits of operational frequency 118 for each sector 124, and thus define shape, size and limits or borders of sector 124. In a case where two or more controllers are teamed up to control an individual sector 124, the controllers may both communicate with aircraft 122 operating in the sector, through the same designated operation frequency 118.

Generally, neighboring sectors for a given sector may be described as vertically spaced adjacent sectors or horizontally spaced adjacent sectors. As shown in FIG. 1, sectors 124B, 124C, 124D represent horizontally spaced neighboring sectors of sector 124A, and each sector being separated by an adjacent sector by boundaries, namely, 126A, 126B, 126C, and 126D. As described above, sectors 124B, 124C, 124D each have designated operation frequencies 118B, 118C, 118D for communication with controllers 116B, 116C, 116D different to that of sector 124A. For example, an aircraft 122 switching between sectors 124A and 124B, crosses common boundary 126A, leading to a change in operating frequency. This change may be communicated automatically via wireless communication through radar communication system 130, to controllers 116. Alternatively, as is described in greater detail below, switching between sectors 124A and 124B may be a command initiated by controller 116 as per instructions of operations manager 114.

As described above, sectors 124 are controlled by one or more controllers 116 to manage safe and efficient operation of flights operating in the respective sectors. Each controller 116A, 116B, 116C, 116D has a workload 117A, 117A, 117C, 117D, and an anticipated workload 117A', 1176', 117C', 117D', respectively. A controller workload or workload 117 on each controller may be determined by the number of control actions performed by the controller to manage the flight operations of aircraft 122 moving in sector 124. For example, the more aircraft operating in a sector 124, the higher the workload 117 for the respective controller 116. Workload 117 may include (i) tracking trajectories of aircraft in sector 124; (ii) checking conflict in flight paths for two or more aircraft 122; (iii) monitoring changes in conditions affecting aircraft in the respective sector, such as wind and weather changes; and (iv) addressing any specific flight related issues arising for specific aircraft in the sector, etc.

In any given time interval, during the course of a day or night, controller workload 117 may fluctuate based on air traffic demands between various origin-destination pairings on flight routes for aircraft 122. As shown in FIG. 2A, in the present example, a first sector configuration 200A has different numbers of aircraft 122 in each of the first sectors 124A, 1246, 124C, 124D compared to sector configuration 125 in FIG. 1. Moreover, each aircraft 122 may be operating in different phases of flight, as described above. Controllers 116A, 1166, 116C, 116D are involved in communicating and managing aircraft 122 in sectors 124A, 1246, 124C, 124D, through communication frequencies 118A, 1186, 118C, 118D, respectively. FIG. 2A depict sectors 124A, 1246, 124C, 124D having one, six, two, and three aircraft operating in the sector, respectively.

First sector configuration 200A including sectors 124A, 1246, 124C, 124D and the aircraft depicted in FIG. 2A represent a situation where controller 1166 controlling sector 1246 may be overworked or overburdened compared to controllers 116A and 116C managing neighboring sectors 124A or 124C. Sector 1246 may be described as saturated or overburdened. Overburdening controllers 116 with workload 117 is undesirable and may be disadvantageous for air traffic efficiency and safety.

Because air traffic in airspace 120 changes over time, it is highly desirable to consider a reconfiguration or resectorization of airspace 120 at some point, in which shapes of sectors 124 are adapted to meet the current traffic situation and demand. First sector configuration 200A may be resectorized to a revised or second sector configuration 200B, as shown in FIG. 2B, including a sector configuration with revised boundaries 126A', 1266', 126C', 126D' between adjacent sectors to balance a controller workload 117 between controllers 116A, 1166 at control station 112. As can be seen, basic sectors 124A, 1246, 124C, 124D are modified to revised or second sectors 124A', 1246', 124C', 124D', including an equal number of aircraft operating in each of the sectors. In the present example, revised sectors 124A', 1246', 124C', 124D' include three aircraft operating per sector 124A', 1246', 124C', 124D', thus balancing workload 117 for controllers 116. Now, each sector in airspace 120 is designated a unique operational frequency 118' (or channel) for communication with controller 116 at control station 112. It may also be noted that revised sectors 124A', 1246', 124C', 124D' may retain original communication frequencies, or have revised or new communication frequencies 118A', 1186', 118C', 118D' different from the communication frequencies used in sector configuration 200A. In any event, aircraft are advised of their correct and current correspondence channels based on their revised sector assignments.

Operations manager 114 of air space management system 100 is configured to dynamically resectorize airspace 120 to ensure that controllers 116 are not overloaded during a given time interval. The operations manager may therefore be referred to as a resectorization operations manager. The resectorization process mainly includes revising boundaries 126 of first sectors 124 to form second sectors 124'. The main functionality of resectorization operations manager 114 is to find an optimal revision of sectors 124 to provide maximum efficiency, and balance controller workload 117 as much as possible between sectors 124.

It will be appreciated that resectorization operations manager 114 may be implemented in a variety of ways. For example, FIG. 3 is a schematic diagram of an example of resectorization operations manager 114. The depicted resectorization operations manager 114 is a system with one or more computing components, which are configured to perform a sequence of operations that can be implemented in hardware, software, or a combination of both. In the context of software, the computing components are configured to provide computing instructions that, when executed by one or more processors, perform the recited operations.

In the depicted example, resectorization operations manager 114 includes an air traffic simulator 302, in electronic communication with a dynamic sectorization or resectorization computing system 304 (or processor). As shown in FIG. 3, resectorization operations manager 114 receives one or more inputs 306 from various sources for facilitating an efficient management of air traffic in airspace 120. Inputs 306 may include, a weather-related data source 306A, a live air traffic-related data source 306B (e.g. live drone traffic), available controllers related data source 306C, aircraft performance-related data source 306D, and local geographic environment-related data source 306E.

It may be understood that data collected from each of the input sources 306 may contribute to a determination of the number of control actions or workload 117 per controller 116 for managing aircraft 122. For example, weather may be a significant factor in aircraft operations. Weather-related data 306A can determine the flight rules under which aircraft 122 can operate, and can also affect safe aircraft separation. Increased aircraft separation requirements during poor weather conditions may in turn increase workload 117 on relevant controllers 116.

Data related to live air traffic 306B and available controllers 306C may be obtained from standard air traffic surveillance protocols and communication with air traffic control station 112, respectively. Likewise, aircraft performance data 306D may be interpreted from airline-specific objectives, and/or airline-specific proprietary data involving high fidelity aircraft models. Similarly, local geographic environment-related data 306E may provide physical geographical restrictions for allocation of sectors. All the above-described data from inputs 306 may be considered by air traffic simulator 302 in generating current and anticipated sector allocations. Alternatively, air traffic simulator 302 may determine at least some of the inputs 306 independently.

Input data 306 may be utilized by air traffic simulator 302 in evaluating a current status of airspace sectors, predicting an anticipated level of air traffic, and/or analyzing associated controller workload for an upcoming time interval. The upcoming time interval may be defined as a time interval relative to the absolute execution time of flight for aircraft 122. The time interval may be any interval of time extending between at least one minute (tactical) to six months (long term) before the flight execution of aircraft 122.

Air traffic simulator 302 analyzes inputs 306 in conjunction with a navigation database 308. Further, one or more computing modules described below may facilitate output of data related to an anticipated sector allocation for plurality of sectors 124. In other words, air traffic simulator 302 assists in pre-planning and obtaining predictive snapshots of sector allocation for aircraft 122 based on associated controller workloads 117.

As described in greater detail below, resectorization computing system 304 analyzes inputs 306 in conjunction with navigation database 308 by implementing one or more computing modules, and outputs revised sector allocations for plurality of sectors 124. Resectorization operations manager 114 may also be configured to perform demand prediction, and plan coordination activities at control station 112. A primary objective in all the above protocols includes avoidance of imbalances between capacity and demand for future flight operations of aircraft 122 in airspace 120.

Referring back to FIG. 1 and FIG. 3, resectorization operations manager 114 of system 100 uses a time-based controller workload model to determine workload 117 for each of those controllers 116 which are directly controlling sector 124 for a given time interval. Workload 117 of the controllers may be determined continuously for consecutive time intervals and may also be described as a dynamic ongoing process.

In an example, as and when operations manager 114 identifies (i) an imbalance of controller workloads 117 more than a preset threshold, or (ii) a difference greater than a pre-selected threshold in anticipated levels of air traffic controller workload 117' between two adjacent sectors over a selected time interval, operations manager 114 dynamically resectorizes airspace 120 to a revised sector configuration to redistribute controller workloads 117 uniformly over the revised sector configuration.

For some air traffic control stations 112, a constant preset control workload difference threshold may be adequate and preferable. For example, as shown in FIG. 1, operations manager 114 may regularly calculate an anticipated average controller workload 117'Avg for a set or group of controllers 116, and then trigger resectorization when any one controller has at least a 10% deviation from the average anticipated controller workload. In another example, the deviation threshold used to trigger resectorization may change at different times of day. The threshold may also vary depending on the overall controller workload being managed by the group of controllers. For example, a larger threshold deviation may be tolerable without resectorization when there is minimal air traffic being managed by the station. Whereas, it may be desirable to resectorize more frequently in response to smaller threshold deviations when overall air traffic controller workload 117 in control station 112 is very high.

The dynamic resectorization operations manager 114 may also be programmed to respond to a change in the number of controllers 116. For example, a trend toward a lighter overall air traffic controller workload 117 may cause a controller 116 to go off duty, leaving a smaller number of controllers 116 to manage the total air traffic being managed by control station 112. In such a case, the module may resectorize from n sectors to n-1 sectors, with the goal of balancing the anticipated air traffic control workload among the remaining controllers 116.

The dynamic resectorization operations manager 114 may also be programmed to allow adjustment of workload between controllers 116 of differing capabilities or work capacities. For example, one controller may be inexperienced compared to another controller and therefore not yet capable of handling a comparable workload.

Once a revised sectorization configuration is determined, operations manager 114 sends a communication regarding the revised sector configuration to all relevant controllers 116 through a communication system such as radar communication system 130. Once all relevant controllers 116 accept the revised sector allocation, the revised sectors become active, and the old sectors are no longer valid. The resectorization revised communication frequencies 118' may be dynamically published and wirelessly communicated to pilots or onboard flight controllers of aircraft 122.

Referring again to FIG. 3, the above described actions of air traffic simulator 302 and resectorization computing system 304 may be iteratively repeated until a conflict-checked, best available revised sector allocation for sector 124 can be determined. In some examples, above-described actions of air traffic simulator 302 and resectorization computing system 304 may be repeated for consecutive time intervals. After a suitably balanced solution is achieved, the revised sector allocations are output by resectorization operations manager 114 to controllers 116 through radar or alternative communication system 130. In this way, resectorization operations manager 114 provides for redistributing or balancing of workloads 117 on controllers 116 managing sectors 124 of controlled airspace 120. If required, the revised sector allocations are communicated to air traffic governing authorities for implementation. The authorities may then examine the request and issue an approval (or denial). This process is consistent with the standard operations and requires no change to existing operational procedures.

B. Illustrative Re-sectorization Methods and Algorithms

Figure 4:
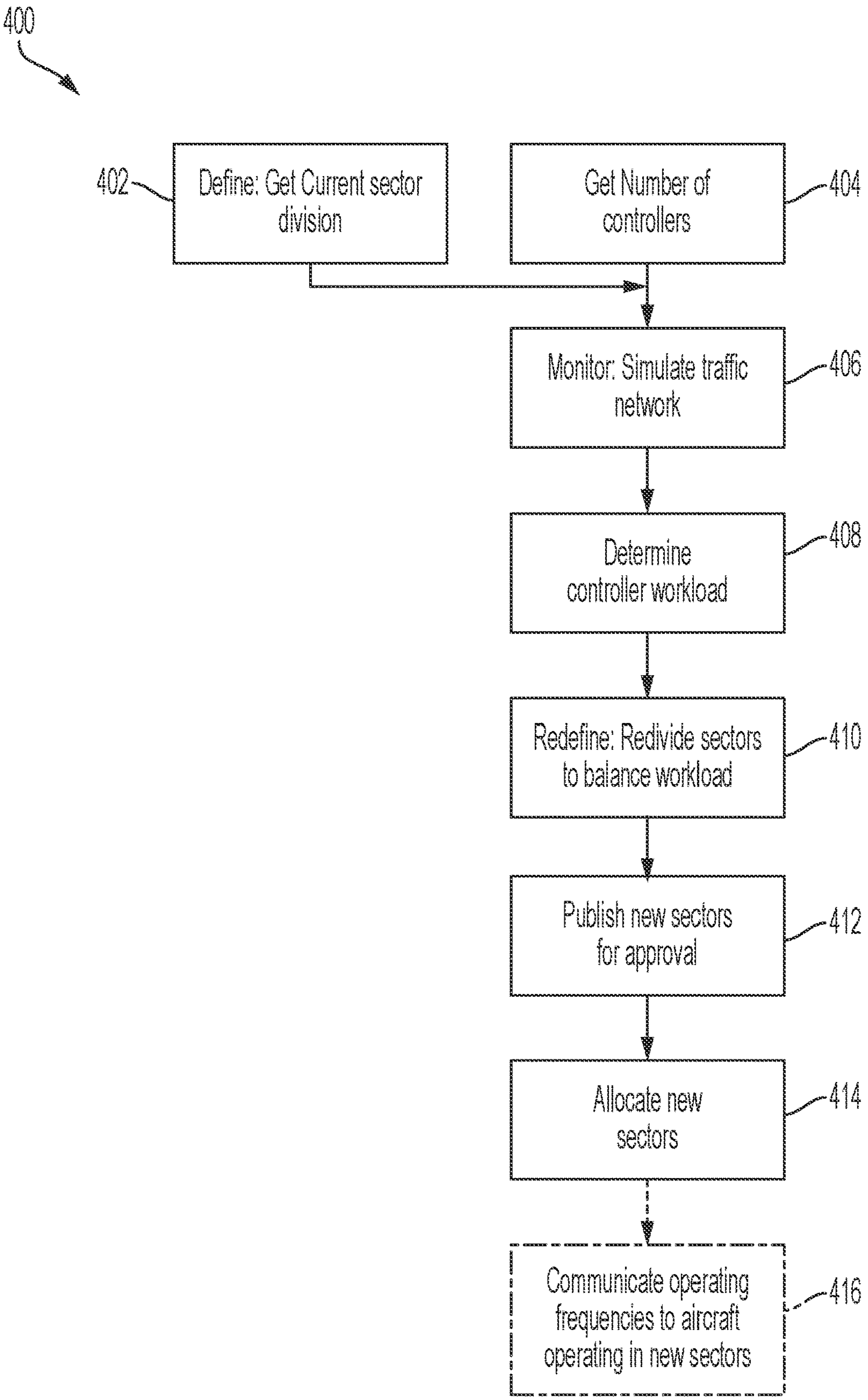
FIG. 4 is a flowchart depicting steps in a resectorization process.
Figure 5A:
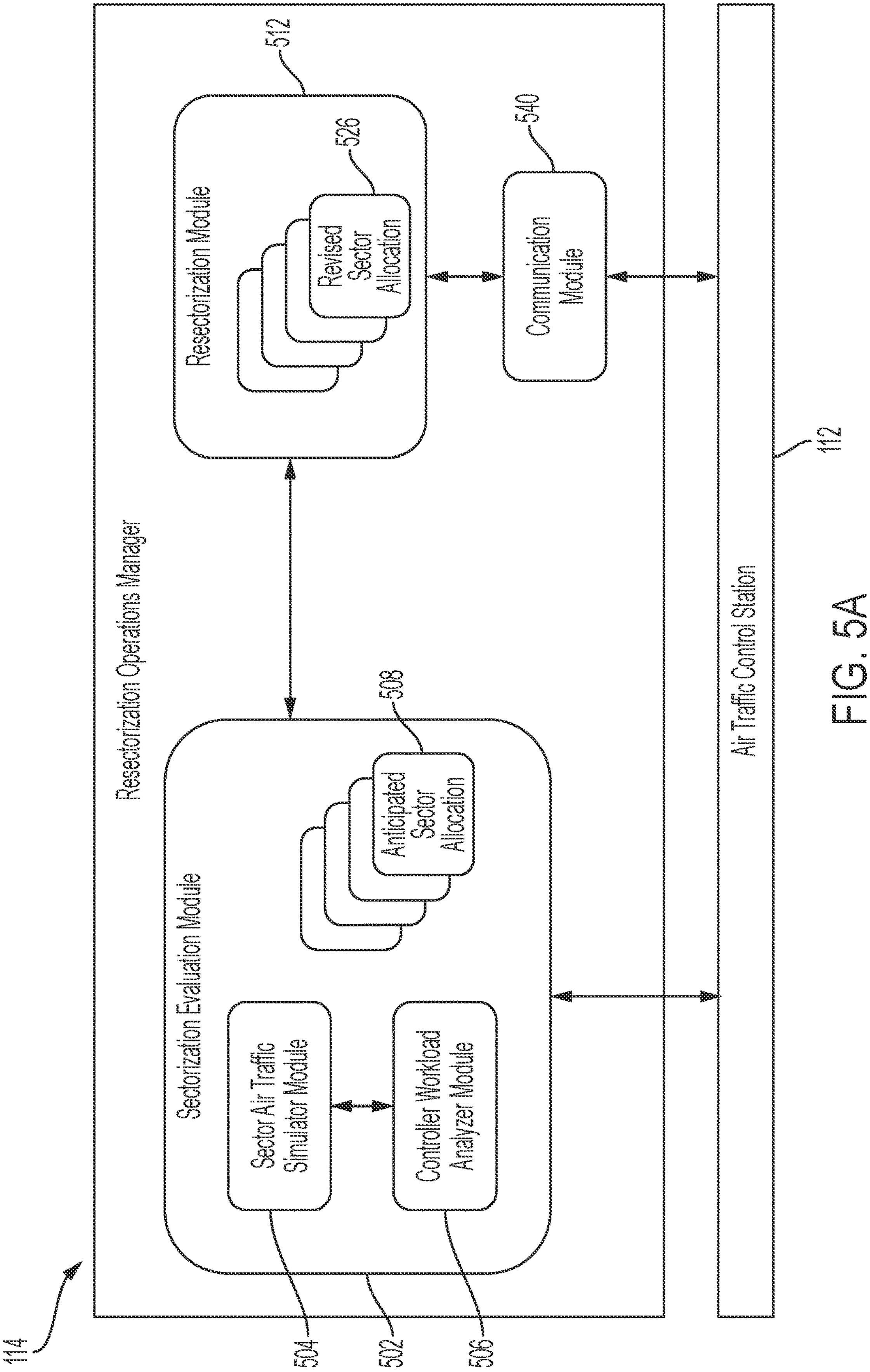
FIG. 5A is a block diagram of an illustrative air traffic data processing system for implementing one or more operations of the sectorization operations manager of FIG. 1.
Figure 5B:
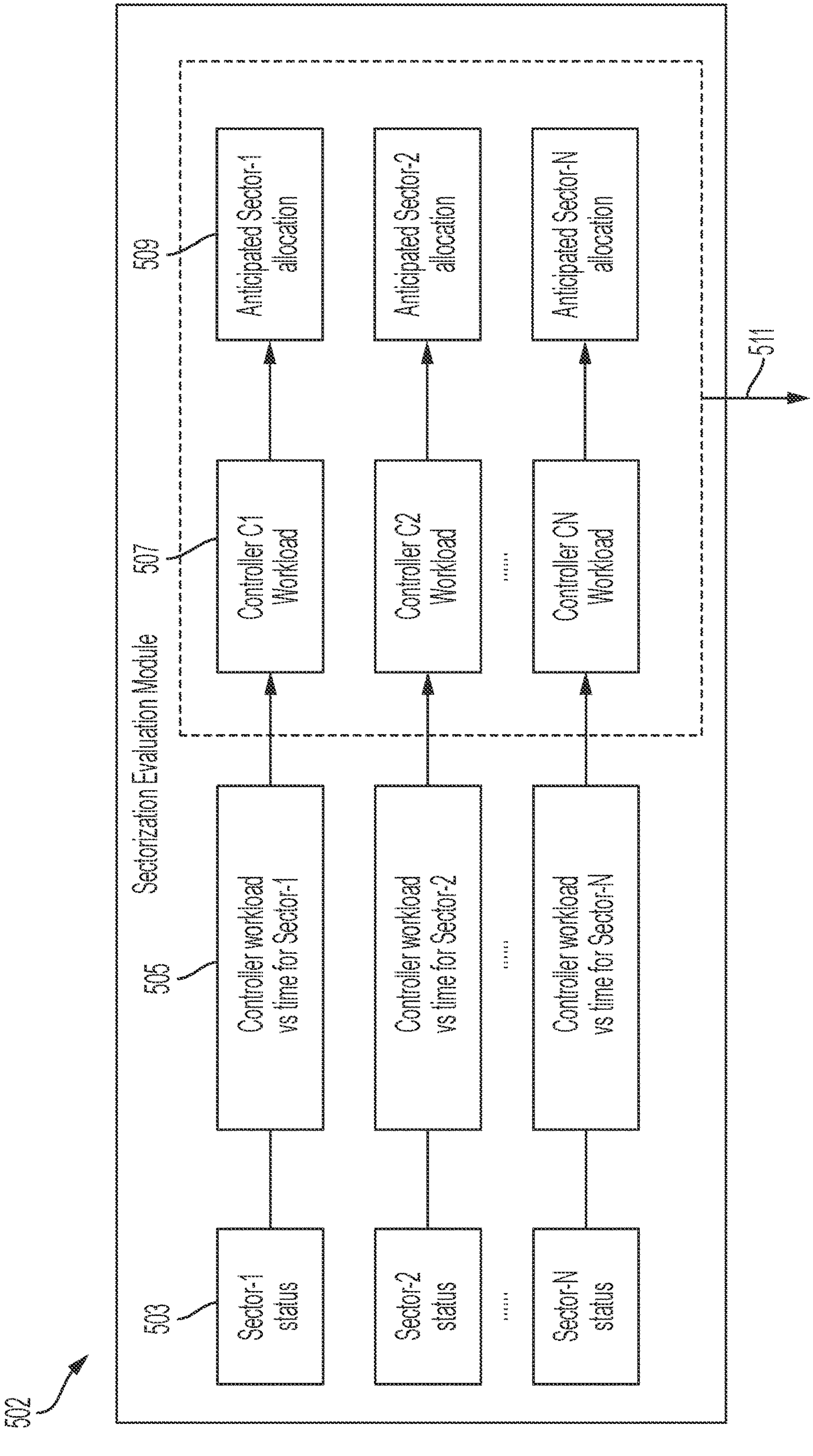
FIG. 5B is a block diagram of an illustrative sectorization evaluation module for use in the airspace management system of FIG. 1
Figure 5C:
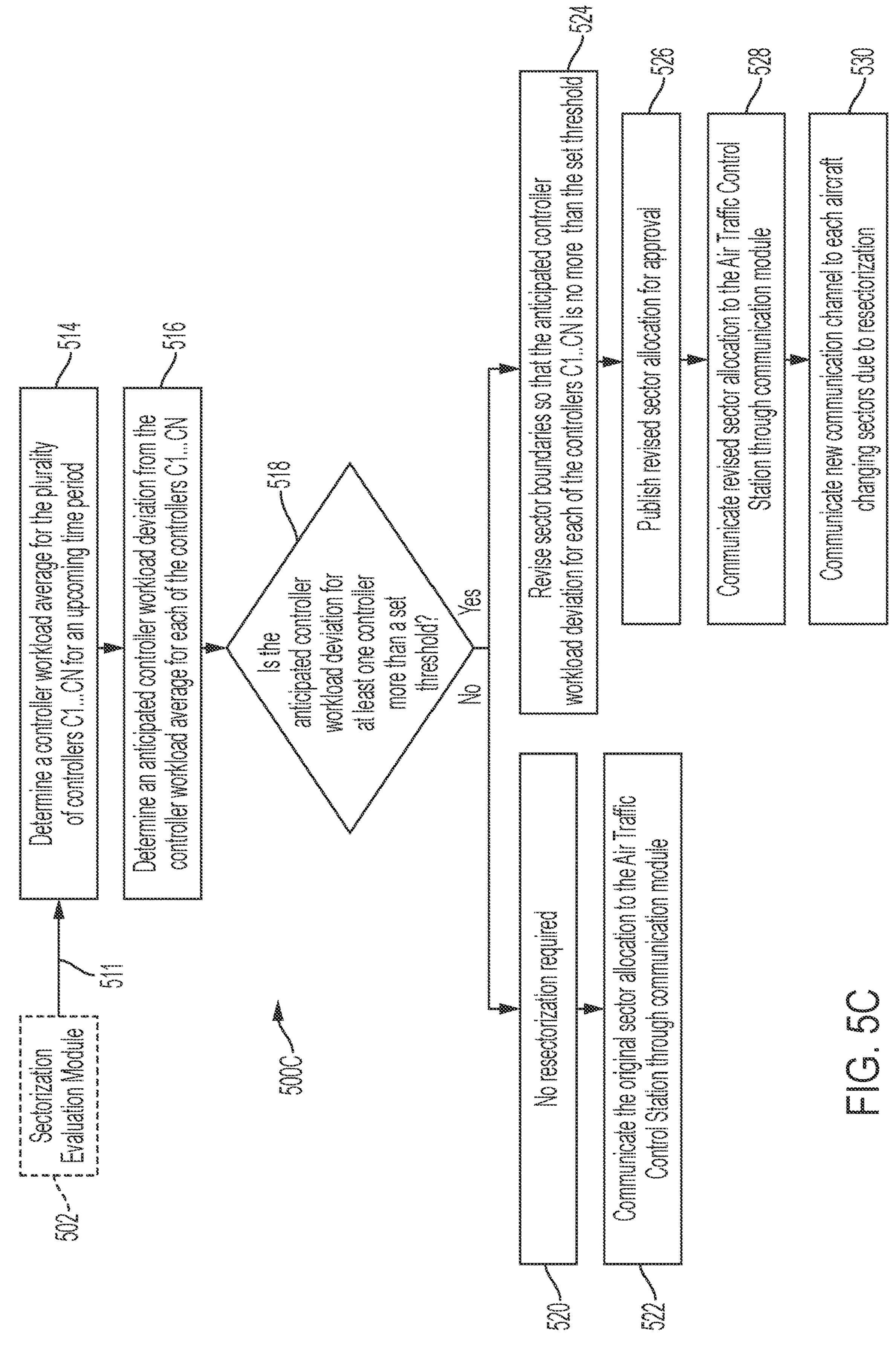
FIG. 5C is a flowchart depicting steps in an illustrative process for use by the resectorization operations manager as shown in FIG. 1.

This section describes steps of illustrative methods and algorithms for carrying out aspects of the airspace resectorization functions of airspace management system 100; see FIGS. 4-5*c*. Aspects of air space management system 100 including air traffic control station 112 and resectorization operations manager 114 described above may be utilized in the method and/or algorithms steps described below. Where appropriate, reference may be made to components and systems that may be used in carrying out each step. These references are for illustration, and are not intended to limit the possible ways of carrying out any particular step of the method.

FIG. 4 is a flowchart illustrating steps performed in an illustrative method 400, and may not recite the complete process or all steps of the method. Although various steps of method 400 are described below and depicted in FIG. 4, the steps need not necessarily all be performed, and in some cases, may be performed simultaneously or in a different order than the order shown.

Step 402 includes defining or getting data related to a current sector configuration, for example sector configuration 125, of at least two adjacent sectors 124 in airspace 120, as shown in FIG. 1, and preparing the data for sharing with air traffic simulator 302 at a step 406, described below. The data related to sector configuration 125 may at least include data related to a count of aircraft 122 operating in sectors 124, the respective phases of flight of the aircraft, and a communication channel or operational frequency 118 utilized for communicating with the aircraft. The phases of flight may be indicative of a workload 117 or number of control actions of a controller 116 required for managing each sector 124. In this manner, step 402 includes defining a first sector configuration.

Step 404 includes obtaining or getting data related to a number of controllers 116 stationed at control station 112 as shown in FIG. 1, and preparing the data for sharing with air traffic simulator 302 at step 406. The data related to the controllers may at least include details of controllers 116 assigned and/or available for controlling one or more aircraft 122 operating in sectors 124 and the current workload of each controller.

Step 406 includes receiving or monitoring current sector configuration data from step 402 and controller data from step 404. The data received may be utilized to simulate an anticipated level of air traffic for a traffic network, including one or more aircraft 122 for each of the sectors over a selected upcoming time interval. For example, first sector configuration 200A may represent an anticipated level of air traffic at an upcoming time interval for sector configuration 125.

Step 408, includes determining an anticipated controller workload or anticipated workload 117' for each of controllers 116 assigned/or available for managing anticipated levels of air traffic in each of the sectors 124 over the selected upcoming time interval. The determined anticipated workload 117' may include combined contributions from monitoring, resolving, instructing, and coordinating activities relating to the aircraft in a given sector. Step 408 further includes detecting a difference greater than a pre-selected threshold in anticipated levels of air traffic control workload 117' between two adjacent sectors over a selected interval of time. In this manner step 408 includes detecting an imbalance in levels of anticipated air traffic controller workload 117' in two or more sectors over a selected time interval.

Step 410 includes redividing or resectorizing sectors 124 to balance or rebalance controller workload 117 based on one or more resectorization algorithms and providing a revised sector configuration 200B. In this manner, sector configurations are redefined. In some examples, the resectorization algorithm may include a criterion based on detecting a difference greater than a pre-selected threshold in anticipated levels of controller workload 117' between two adjacent sectors over the selected interval of time. In some examples, the resectorization algorithm may include a criterion based on detecting a deviation greater than a pre-selected threshold from anticipated controller workload for at least one controller. In general, the resectorization algorithm may include any suitable criterion indicative of workload differences between controllers. Step 410, further includes redefining all of the sectors simultaneously such that no two adjacent sectors have anticipated air traffic controller workload 117' differing more than the pre-selected threshold. In an example, pre-selected threshold is at least 5%. In this manner, step 410 includes rebalancing levels of anticipated air traffic workload 117' in two or more sectors by redefining the sector boundaries.

Step 412 includes publishing and seeking approval for revised sector configuration 200B, having revised boundaries with air traffic control station 112. Step 412 may further include sending a communication to all controllers involved in the resectorization process. Step 412 may further include receiving approval from all controllers involved in the resectorization process, designating revised sectors 124' as active sectors and simultaneously invalidating sector configuration 125.

Step 414 includes allocating revised sector configuration 200B to those aircraft 122 anticipated to operate in the revised sectors. In this manner, step 414 includes implementing a new sector configuration. Step 414 may further include communicating revised sector configuration 200B to air control station 112. Step 414 may optionally include sub-step 416, which includes communicating revised sector frequencies 118' to each of the aircraft 122 anticipated to operate in respective revised sectors 124' by standard wireless data communication protocols. In this manner, sub-step 416 implements and communicates operating frequencies to aircraft operating in new sectors.

Turning to FIGS. 5A-5C, FIG. 5A is a block diagram of an illustrative data processing environment implemented by the resectorization processing manager of FIG. 1 and FIG. 3. Air traffic data processing at the resectorization processing manager is initiated by a sectorization evaluation module 502, which outputs data related to a plurality of anticipated sector allocations 508. Output data 508 may include information related to anticipated levels of air traffic and controller workload for the plurality of sectors during one or more upcoming time intervals. A schematic diagram for an evaluation of airspace sectors by sectorization evaluation module 502 is shown in FIG. 5B.

A resectorization module 512 receives the data output by sectorization evaluation module 502 to plan and implement a resectorization process to output data related to a plurality of revised sector allocations 526, including revised sector boundaries. A flowchart depicting steps in an illustrative algorithm 500C suitable for use by resectorization module 512 is shown in FIG. 5C. Further, the data related to a plurality of revised sector allocations 526 output by resectorization module 512 is communicated to air traffic control station through a communication module 540.

As depicted in FIG. 5A, sectorization evaluation module 502 includes a sector air traffic simulator 504 working in conjunction with a controller workload analyzer module 506. Sector air traffic simulator 504 facilitates predicting of anticipated air traffic status 503, as shown in FIG. 5B, of plurality of sectors 124 during one or more upcoming time intervals. Based on anticipated levels of air traffic status 503, controller workload analyzer module 506 facilitates predicting anticipated levels of controller workload versus time 505 for each of plurality of sectors 124. Air traffic data 507 related to anticipated controller workload 117' of plurality of controllers 116 along with anticipated sector allocation 509 for plurality of sectors 124 is output as data 511 by sectorization evaluation module 502.

FIG. 5C is a flowchart illustrating steps performed in an illustrative algorithm 500C, and may not recite the complete process or all steps of the algorithm. Although various steps of algorithm 500C are described below and depicted in FIG. 5C, the steps need not necessarily all be performed, and in some cases, may be performed simultaneously or in a different order than the order shown.

Step 514 includes receiving data 511 output by sectorization evaluation module 502. Further, step 514 may include determining a controller workload average for plurality of controllers C1 . . . CN of sector network 125 of airspace 120 for an upcoming time interval.

Step 516 includes determining an anticipated controller workload deviation from the controller workload average for each of the controllers C1 . . . CN.

Step 518 includes determining if anticipated controller workload deviation for at least one controller is more than a preset threshold.

For example, if the anticipated controller workload deviation for at least one controller is not more than a preset threshold, then it may be determined that resectorization is not required and control passes to step 520. Further, at step 522, the original sector allocation is communicated to the control station through the communication module.

In other examples, if the anticipated controller workload deviation for at least one controller is more than a preset threshold, then at step 524 it may be determined that resectorization is required. Step 524 may further include revising sector boundaries so that the anticipated controller workload deviation for each of the controllers C1 . . . CN is no more than the preset threshold. Further, at step 526, revised sector allocation may be published for approval and subsequent output as approved revised sector allocations. Further, at step 528, revised sector allocation may be communicated to the control station through communication module 540. At step 530, information about a new communication channel including a new or revised communication frequency may be communicated to each aircraft changing sectors due to resectorization.

Illustrative Combinations and Additional Examples

This section describes additional aspects and features of airspace management systems and methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method of controlling air traffic in an airspace, comprising:

defining a first sector configuration of at least two adjacent sectors in the airspace, each sector being assigned to a station controller in an air traffic control station to manage movement of one or more aircraft in the respective sector, and a communication channel specific to the sector, for each sector, monitoring an anticipated level of air traffic controller workload over a selected time interval, detecting a difference greater than a pre-selected threshold in anticipated levels of air traffic controller workload in the two adjacent sectors over the selected time interval, redefining the first sector configuration into a second sector configuration of the two adjacent sectors such that the difference in controller workload in the two adjacent sectors is below the threshold, and implementing the second sector configuration.

A1. The method of A0, wherein the one or more aircraft include inbound flights to an airport.

A2. The method of A0, wherein the one or more aircraft include outbound flights from an airport.

A3. The method of any of A0-A2, wherein the defining step includes defining multiple sectors surrounding an air traffic control station.

A4. The method of any of A0-A3, wherein the redefining step includes redefining all of the sectors simultaneously such that no two adjacent sectors have anticipated air traffic controller workload differing more than the threshold.

A5. The method of any of A0-A4, wherein the selected time interval is between one minute and one hour.

A6. The method of any of A0-A5, further comprising: obtaining acceptance of the second sector configuration from the station controllers before the implementing step.

A7. The method of any of A0-A6, wherein the redefining step includes altering a common boundary between the two adjacent sectors.

A8. The method of any of A0-A7, further comprising: reassigning a new communication frequency to all aircraft that move from one sector to another sector due to the implementing step.

A9. The method of any of A0-A8, wherein the anticipated level of air traffic controller workload includes management of unmanned aircraft.

A10. The method of any of A0-A9, wherein the anticipated level of air traffic controller workload includes management of manned aircraft.

A11. The method of any of A0-A10, wherein each station controller is a person.

A12. The method of any of A0-A11, wherein each station controller includes a processor programmed to manage control of air traffic in the respective sector.

A13. The method of any of A0-A12, wherein the preselected threshold is at least 5%.

B0. A system for managing air traffic in an airspace, comprising:

a processor configured to balance levels of anticipated air traffic controller workload between controllers in an air traffic control station, the processor being programmed to:

define a first sector configuration of at least two adjacent sectors in an airspace, each sector being assigned to a station controller for assigned to managing movement of one or more aircraft in the respective sector, and a communication channel different from any other sector, for each sector, monitor an anticipated level of air traffic controller workload over a selected time interval, detect a difference greater than a pre-selected threshold in anticipated levels of air traffic control workload between the two adjacent sectors over the selected time interval, redefine the first sector configuration into a second sector configuration of the two adjacent sectors such that the difference in anticipated air traffic controller workload in the two adjacent sectors is below the threshold, and implement the second sector configuration.

B1. The system of B0, wherein the redefining step includes altering a common boundary between at least two adjacent sectors.

B2. The system of B0 or B1, wherein the processor is further programmed to communicate a change of communication channel to each aircraft that switches sectors due to the redefining and implementing steps.

C0. A method of balancing air traffic controller work load in, comprising:

defining multiple sectors in an airspace, for each sector, assigning a controller to manage movement of one or more aircraft in the respective sector, detecting an imbalance in levels of anticipated air traffic controller workload in two or more sectors over a selected time interval, and rebalancing the levels of anticipated air traffic workload in the two or more sectors by redefining the sectors.

C1. The method of C0, wherein the rebalancing step includes altering a common boundary between at least two adjacent sectors.

C2. The method of C0 or C1, further comprising:

communicating a change of communication channels to an aircraft that switches sectors due to the rebalancing step.

Advantages, Features, and Benefits

The different examples of the air traffic management described herein provide several advantages over known solutions for guiding safe and efficient flight for aircraft. For example, illustrative examples described herein allow for balancing air traffic workload in an air traffic control station.

Additionally, and among other benefits, illustrative examples described herein allow determining an anticipated workload on a controller controlling an air space sector proximate to an air traffic control station over a selected time interval.

Additionally, and among other benefits, illustrative examples described herein allow for real-time air traffic prediction in a plurality of adjacent sectors proximate to an air traffic control station.

Additionally, and among other benefits, illustrative examples described herein allow for controlling and managing of unmanned air traffic with higher safety and efficiency.

No known system or device can perform these functions, particularly in a dynamically changing air traffic scenario in a plurality of airspace sectors. Thus, the illustrative examples described herein are particularly useful for airport air traffic management. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of controlling air traffic in an airspace, comprising:

defining, by a device, a first sector configuration of at least two adjacent sectors in the airspace, each sector, of the at least two adjacent sectors, being assigned to a station controller in an air traffic control station to manage movement of one or more aircraft in a respective sector of the at least two adjacent sectors, and a communication channel specific to a sector;

collecting, by the device, weather condition data for the airspace;

collecting, by the device, a number of available station controllers, wherein available station controllers include at least a first station controller and a second station controller;

collecting, by the device, flight characteristics and vehicle specifications for the one or more aircraft in the airspace;

for each sector, computing, by the device, a current level of air traffic controller workload;

for each sector, computing, by the device, an anticipated average level of air traffic controller workload over a selected time interval for the available station controllers with an air traffic simulator based on the collected weather condition data, the number of the available station controllers, and the flight characteristics and vehicle specifications for the one or more aircraft;

detecting, by the device, a difference greater than a deviation from a pre-selected threshold in the anticipated average level of air traffic controller workload in the at least two adjacent sectors over the selected time interval;

redefining, by the device the first sector configuration into a second sector configuration of the at least two adjacent sectors such that the difference in air traffic controller workload in the at least two adjacent sectors is below the pre-selected threshold, wherein redefining the first sector configuration into the second sector configuration includes adjusting the air traffic controller workload based on differing capabilities or differing experience levels of the available station controllers, wherein a first workload, of the air traffic controller workload, of the first station controller is adjusted to be a smaller than a second workload, of the air traffic controller workload, of the second station controller based on the first station controller being less experienced than the second station controller; and implementing, by the device, the second sector configuration.

2. The method of claim 1, wherein the one or more aircraft include inbound flights to an airport.

3. The method of claim 1, wherein the defining step includes defining multiple sectors surrounding an air traffic control station.

4. The method of claim 3, wherein the redefining step includes redefining all of the sectors simultaneously such that no two adjacent sectors have anticipated air traffic controller workload differing more than the pre-selected threshold.

5. The method of claim 1, further comprising:

obtaining acceptance of the second sector configuration from station controllers before the implementing step.

6. The method of claim 1, wherein the redefining step includes altering a common boundary between the at least two adjacent sectors.

7. The method of claim 1, wherein each station controller includes a processor programmed to manage control of air traffic in a respective sector.

8. The method of claim 1, wherein the anticipated average level of air traffic controller workload is computed with the air traffic simulator in conjunction with a navigation database.

9. The method of claim 1, wherein the pre-selected threshold differs according to a time of day.

10. The method of claim 1, wherein the anticipated average level of air traffic controller workload is computed continuously for consecutive time intervals as an ongoing process.

11. The method of claim 1, wherein the pre-selected threshold depends on an overall controller workload for all station controllers to which a sector is assigned.

12. The method of claim 1, further comprising:

redefining the first sector configuration into the second sector configuration in response to a change in the number of available station controllers.

13. The method of claim 1, further comprising:

redefining the first sector configuration into the second sector configuration using an iteratively repeated process that includes conflict-checking and revising until a balanced solution is achieved.

14. The method of claim 1, further comprising:

redefining the first sector configuration into the second sector configuration based on simulating anticipated air traffic for the at least two adjacent sectors, wherein the at least two adjacent sectors include geometry that reflects a flow and a density of air traffic.

15. The method of claim 1, wherein the deviation is at least a 10% deviation.

16. A system for managing air traffic in an airspace, comprising:

a processor configured to balance levels of anticipated air traffic controller workload between air traffic controllers in an air traffic control station, the processor being programmed to:

define a first sector configuration of at least two adjacent sectors in the airspace, each sector, of the at least two adjacent sectors, being assigned to a station controller for managing movement of respective aircraft, collect a number of available air traffic controllers, wherein available air traffic controllers include at least a first air traffic controller and a second air traffic controller, collect flight characteristics and vehicle specifications for aircraft in the at least two adjacent sectors, for each sector, compute both a current level and an anticipated average level of air traffic controller workload for the available air traffic controllers over a selected time interval with an air traffic simulator and based on the number of the available air traffic controllers and the vehicle specifications and flight characteristics of the aircraft, detect a difference greater than a pre-selected threshold in the anticipated average level of air traffic control workload between the at least two adjacent sectors over the selected time interval, redefine the first sector configuration into a second sector configuration of the at least two adjacent sectors such that the difference in anticipated air traffic controller workload in the at least two adjacent sectors is below the pre-selected threshold, wherein redefining the first sector configuration into the second sector configuration includes adjusting the air traffic controller workload based on differing capabilities or differing experience levels of the available air traffic controllers, wherein a first workload, of the air traffic controller workload, of the first-air traffic controller is adjusted to be a smaller than a second workload, of the air traffic controller workload, of the second air traffic controller based on the first air traffic controller being less experienced than the second air traffic controller; and implement the second sector configuration.

17. The system of claim 16, wherein the processor being programmed to redefine the first sector configuration into the second configuration of the at least two adjacent sectors, is further programmed to:

alter a common boundary between two or more adjacent sectors.

18. A method of balancing air traffic controller workload, comprising:

defining, by a device, multiple sectors in an airspace;

for each sector, of the multiple sectors, assigning, by the device, a controller to manage movement of one or more aircraft in a respective sector of the multiple sectors;

collecting, by the device, weather condition data for the airspace;

collecting, by the device, a number of available air traffic controllers, wherein available air traffic controllers include at least a first air traffic controller and a second air traffic controller;

collecting, by the device, flight characteristics and vehicle specifications for the one or more aircraft in the airspace;

detecting, by the device, an imbalance in levels of anticipated air traffic controller workload in two or more sectors, of the multiple sectors, over a selected time interval with an air traffic simulator and based on the collected weather condition data, the number of the available air traffic controllers, and the flight characteristics and vehicle specifications of the one or more aircraft; and rebalancing, by the device, the levels of anticipated air traffic controller workload in the two or more sectors by redefining the two or more sectors, wherein redefining the two or more sectors includes adjusting the anticipated air traffic controller workload based on differing capabilities or differing experience levels of the available air traffic controllers, wherein a first workload, of the air traffic controller workload, of the first air traffic controller is adjusted to be a smaller than a second workload, of the air traffic controller workload, of the second air traffic controller based on the first air traffic controller being less experienced than the second air traffic controller.

19. The method of claim 18, wherein the rebalancing step includes altering a common boundary between at least two adjacent sectors of the multiple sectors.

20. The method of claim 18, further comprising:

communicating new communication frequencies to one or more aircraft based on redefining the two or more sectors.

* * * * *